United States Patent [19]
Collier et al.

[11] Patent Number: 5,959,960
[45] Date of Patent: Sep. 28, 1999

[54] METHOD OF PROVIDING A RANGE OF CONFORMALITIES FOR OPTICAL RECORDING LAYERS

[75] Inventors: Susan Starr Collier, Leroy; Michael Paul Cunningham; Csaba Andras Kovacs, both of Rochester, all of N.Y.

[73] Assignee: Eastman Kodak Company, Rochester, N.Y.

[21] Appl. No.: 08/721,919

[22] Filed: Sep. 27, 1996

[51] Int. Cl.⁶ .................................. B32B 3/00; G11B 7/24
[52] U.S. Cl. ................... 369/275.1; 369/121; 369/275.4; 369/278; 369/280; 369/283; 369/284; 369/286; 369/288; 372/51; 372/53; 346/135.1; 347/264; 430/270.15; 430/270.16; 430/270.17; 430/270.18; 430/270.21; 430/270.2; 430/945; 430/964; 252/583; 252/582; 427/162; 427/164

[58] Field of Search ...................... 372/51, 53; 428/64.8, 428/457, 913; 346/135.1; 347/264; 369/288, 283, 275.1, 275.4, 278, 280, 284, 286, 121; 252/583, 582; 427/162, 164; 430/270.15, 270.16, 270.17, 270.18, 945, 270.21, 270.2, 964

[56] References Cited

U.S. PATENT DOCUMENTS

| | | | |
|---|---|---|---|
| 5,274,623 | 12/1993 | Usami et al. | 369/275.1 |
| 5,283,094 | 2/1994 | Sasakawa et al. | 428/64 |
| 5,369,321 | 11/1994 | Koike et al. | 369/275.4 |
| 5,686,221 | 11/1997 | Koletar | 430/254 |

*Primary Examiner*—Frederick Krass
*Attorney, Agent, or Firm*—John R. Everett

[57] ABSTRACT

A method of coating an optical recording layer on a transparent grooved substrate is disclosed. The recording layer is coated from a mixture of a primary and a secondary solvent. The solvent mixture provides a wide range of conformalities for optical recording layers.

21 Claims, 1 Drawing Sheet

METHOD OF PROVIDING A RANGE OF CONFORMALITIES FOR OPTICAL RECORDING LAYERS

FIELD OF THE INVENTION

This invention relates to optical recording elements, especially methods and coating solutions for making such elements.

BACKGROUND OF THE INVENTION

There are many known types of optical recording elements including writeable optical recording elements. Writeable optical recording media can be recorded in real time. Information can be added to the CD at any time and can then be conveniently played back on a conventional CD player.

Writeable CD elements must meet a wide variety of requirements. First and foremost they must be readable using the large population of various CD players currently commercially available. This requires that parameters such as substrate material, substrate groove geometry, laser recording dye layer, recording layer conformality must all be optimized to work together as a parameter set. A change in one parameter in a set requires changes in the other parameters of that set.

Designers of optical recording elements have a variety of tools available to assist them in the fabrication of media which will conform to the various CD requirements. Foremost are the various computerized simulation techniques which are well known to those skilled in the art. The general description of the optics of laser readout systems and the computing procedures used for the simulations have been described by Hopkins, J. Opt. Soc. Am., Vol. 69, No. 1, p.4 (1979); G. Bouwhuis and J. Braat, Applied Optics and Opt. Eng., Vol. IX, (1983), p. 73; J. Braat, Proc. Int. Symp. on Optical Memory, Jap. J. of Appl. Phys., Vol. 28, (1989), Suppl. 28-3, p. 103; Y. Miyazaki and K. Manabe, Proc. Int. Symp. on Optical Memory, Jap. J. of Appl. Phys., Vol. 28, (1989), Suppl. 28-3, p. 109. The use of those tools are frequently cited in the literature, for example, by A. Inoue and E. Muramatsu, Proceedings of the ODS conference, Dana Point, Calif., 1994, Paper MA3-1 and U.S. Pat. No. 5,369,321 by Koike et al. These tools can be used to predict a desirable set of parameters when one or more of the parameters have been preselected.

Writeable CD elements are generally prepared by spin coating a dye solution on a grooved polycarbonate substrate. The dye forms the recording layer. Subsequent finishing is similar to that for pressed media; the dye layer is overcoated with a reflective layer and a protective layer. The parameter conformality (see FIG. 1) is determined in large part by the solvent used in the spin coating process. The solvent must apply the dye such that the amount of dye in the groove of the substrate and on the ungrooved portion (commonly called the 'land' by those skilled in the art) is precisely controlled as described in U.S. Pat. No. 5,369,321 by T. Koike et. al. Only a very small number of solvents are known that will dissolve useful dyes and dye mixtures, without attacking the substrate.

Since the choice of suitable coating solvents is limited, and a given coating solvent results in a fixed conformality, the choice of other useful writeable CD parameters is also limited. For example, a common use of the above described computer modeling tools is to predict the substrate groove geometry required to accommodate a particular laser dye recording layer conformality. Limits in available conformality reduce the choice of substrate groove geometries.

SUMMARY OF THE INVENTION

Figure 1:
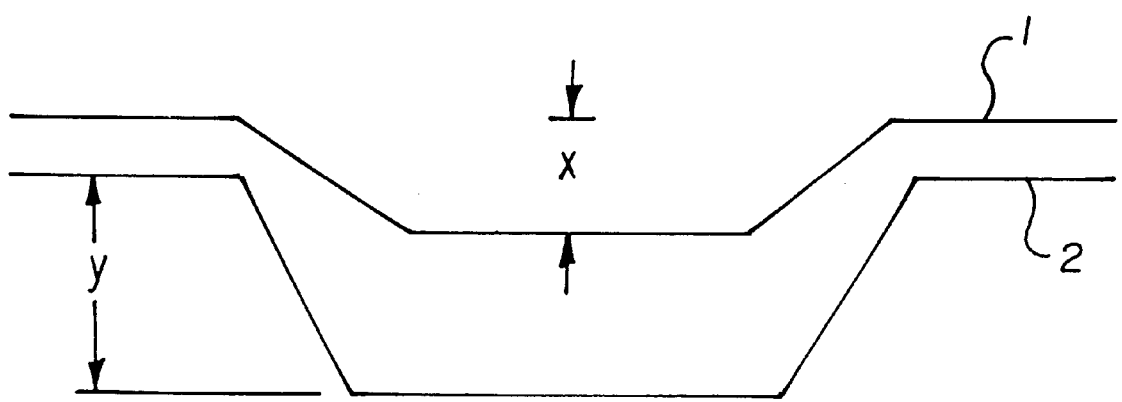
FIG. 1 is used to define conformality as used herein.

The present invention provides a method of coating an optical recording layer on a transparent grooved support, comprising the steps of:

(I) forming a solution of a laser recording dye, including dye mixtures, in a solvent mixture of a primary and a secondary solvent;

(II) coating the solution on the grooved side of the support; wherein the solvent mixture contains:

(A) from 90 to 99 volume percent of the primary solvent and the primary solvent is selected from the group consisting of:
 (i) 1-methoxy-2-propanol:
 (ii) a solvent for the dye that has a solvent functional group selected from esters, ketones and ethers; and the solvent functional group has as hindering groups (a) at least one t-butyl group on one side thereof or (b) two groups on opposite sides thereof selected from the group consisting of isoamyl, t-butyl, isobutyl and isopropyl; provided that both groups cannot be isopropyl and (c) the hindering groups are adjacent to the solvent functional group; and
 (iii) a solvent having a Hansen solvent parameter near zero or near 6; and (B) from 1 to 10 volume percent of the secondary solvent that has a higher boiling point than the primary solvent and is selected from solvents that are more polar than hydrocarbons and less polar than water. The novel solution of the laser recording dye and solvent mixture makes this method possible.

The result of this method is an optical recording element, particularly a writeable element, comprising, in the following order, a transparent grooved substrate, the optical recording dye, and a reflective layer.

This invention provides a means, heretofore unavailable, to achieve a wide range of conformalities for the laser recording layers used in writeable elements. Thus, the invention expands the available choices of other important parameters such as substrate groove geometries.

DETAILS OF THE INVENTION

This invention discloses mixtures of solvents with which laser recording layers can be solvent coated. Such solvent mixtures provide a variety of conformalities on grooved substrates, especially polycarbonate substrates. This increase in available conformalities is achieved without significant damage to the substrates. The primary solvent is a good solvent for the laser recording layer material and is non-deleterious to the substrate under the coating conditions described herein under the section titled Optical Recording Elements. The secondary, conformality controlling solvent has a lower vapor pressure than the bulk solvent, is the last solvent to evaporate from the dye layer and, at high concentration, is usually deleterious to the substrate. At the low (1–10%) level employed in the present invention, however, damage is minimal yet the ability of the second solvent to control conformality is maintained.

Conformality, as used herein, is defined with reference to FIG. 1. Therein, a dye layer 1 is shown applied to a grooved substrate 2 having groove depth y, such that the dye partially conforms to the groove. The depth of dye is x. Conformality is defined as the ratio of x to y.

The mixtures are used to form laser recordable dye coating solutions. The term "laser recordable dye" as used herein means a dye which, under laser illumination, undergoes chemical or physical changes of sufficient magnitude to be read out by the same or another laser. Such dyes are commonly used in optical recording elements including writeable CD elements. Examples of laser recordable dyes include formazan, indoaniline, cyanine, azo, metallized azo, phthalocyanine, metallized formazan dyes and mixtures of such dyes.

The dye solutions of this invention advantageously contain 1 to 10 weight percent of a laser recordable dye and 99 to 90 weight percent of the solvent mixtures. The preferred range is 1 to 7 weight percent of the dye and 99 to 93 weight percent of the solvent mixture. Especially preferred is 2 to 4 weight percent of the dye and 98 to 96 weight percent of the solvent mixture. All weight percents are based on total solids.

Besides the dyes and solvent mixtures, various additives may be added to the dye solution used in the present invention, depending on the properties desired in individual cases. Optional additives include, for example, surfactants, stabilizers, and adhesion promoters. Although the amount of these additives varies depending on the properties desired, it is usually about 0.1 to about 5 weight percent based on total solids.

Primary solvents

The primary solvent group (i) is 1-methoxy-2-propanol (MP).

Examples of primary solvent group (ii) are presented in Table 1.

TABLE 1

| Ester group | Ketone group | Ether group |
| --- | --- | --- |
| t-Butyl acetate | t-Butyl methyl ketone | Diisobutyl ether |
| t-Butyl propionate | Diisobutyl ketone | |
| isoPropyl isobutyrate | | |
| isoButyl isobutyrate | | |
| Ethyl pivalate | | |

Primary solvent group (iii) solvents are selected to minimize their effect on the substrate. Useful solvents include alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methyl ethyl ketone, 4-hydroxy-4-methyl-2-pentanone, hexane, cyclohexane, ethylcyclohexane, octane, benzene, toluene, and xylene. Preferred solvents are hydrocarbon solvents and alcohol solvents since they have the least effect on the preferred polycarbonate substrates. Mixtures of these solvents can also be used as the primary solvent of group (iii).

The requirements for the secondary solvent have been described previously herein. Ample representative examples are present in the working examples.

Optical Recording Elements

The optical elements of the invention comprise a light transmitting, typically pregrooved substrate, the dye optical recording layer overlaying the substrate, a light reflective layer overlaying the light absorptive layer and a protective layer overlaying the light reflective layer. The recording process will produce marks of lower reflectivity than the unmarked areas of the disk when written and read with a diode laser. In some embodiments the substituents in the dye molecule are selected so that the real part of the complex refractive index (n) of the unwritten light absorptive layer measured with a 780 nm light source is not less than 1.8 and the imaginary part (k) is not greater than 0.15. Optical recording elements recorded at shorter wavelengths having a different refractive index are also contemplated.

The substrate may be any transparent material that satisfies the mechanical and optical requirements. The substrates are generally pregrooved with groove depths from 20 nm to 250 nm, groove widths 0.2 to 1 $\mu$m and a pitch 0.5 to 2 $\mu$m. The preferred material is polycarbonate, other materials are glass, polymethylmethacrylate and other suitable polymeric materials.

The preparation of the optical recording element of the invention is achieved by spin coating of the laser dye solution onto a transparent grooved substrate. For coating, laser recordable dye with or without addenda is dissolved in a suitable solvent so that the dye is 20 or less parts by weight to 100 parts of solvent by volume. Typical concentrations are 3 to 5 parts by weight to 100 parts of solvent by volume. At these concentrations the solutions are typically spin coated at 800–1200 rpm for times of 5 to 20 seconds. The dye recording layer of the element is then overcoated with a metal reflective layer under reduced pressure by resistive heating or a sputter method and finally overcoated with a protective resin.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum, copper and alloys thereof.

The protective layer over the reflective layer is similarly conventional for this art. Useful materials include UV curable acrylates.

One preferred protective layer is disclosed in U.S. Pat. No. 5,312,663 in the names of Kosinski and Amell. This patent discloses a two layer structure in which the layer adjacent to the reflective layer is spin coated and the second layer is screen printed.

An intermediate layer, to protect the metal layer from oxidation, can also be present.

The element of the invention can have pre-recorded ROM areas as described in U.S. Pat. No. 4,940,618. The surface of the substrate can have a separate heat deformable layer as described in U.S. Pat. No. 4,990,388. Other patents relating to recordable CD-type elements are U.S. Pat. Nos. 5,009,818; 5,080,946; 5,090,009; 4,577,291; 5,075,147; and 5,079,135.

EXAMPLES

The following examples further clarify the capability of the dye solutions and methods of this invention to provide a wide range of conformality values.

In a typical experiment, a dye solution was prepared in a mixture of two solvents, one of which (the primary solvent) is usually 1-methoxy-2-propanol. Typical concentrations of the secondary (conformality controlling) solvent range from 1 to 10 volume percent. The resulting dye solutions are filtered through a 0.2 $\mu$m Teflon filter and spin coated onto grooved polycarbonate CD substrates using methods well known to those skilled in the art. A Headway Research Coater (Model No. CB 15/PWM 101) was used for spin coating and duplicate samples were prepared. One sample was coated with about 100 nm of gold (applied by resistive heating in vacuum (Veeco Co. Vacuum Depositor)). The conformality of the resulting film was measured by a reflective diffraction method as described by H. Sekizawa et. al., Applied Optics, Vol. 23, pg. 2830, Aug. 15, 1984 at 672 nm. The other sample was washed with methanol and the resulting groove structure of the disk measured by transmission diffractometry for comparison with an untreated disk.

Example 1

A solution of the dye CD-1 in 1-methoxy-2-propanol only was spin coated to an optical density of 1.03 at 672 nm on a substrate having grooves 152 nm deep. The conformality of the dye coated element, measured as described above, was 0.79. Upon addition of 3% by volume of 4-hydroxy-4-methyl-2-pentanone to the above solution and recoating, the conformality dropped to 0.45.

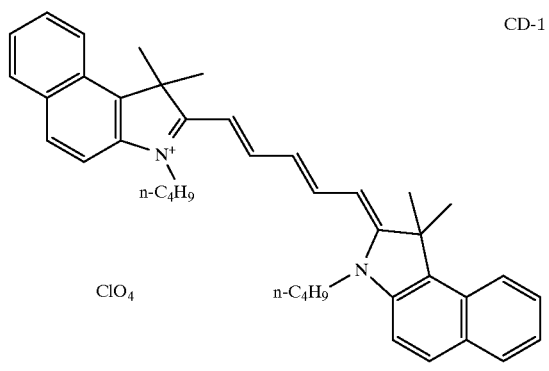

CD-1

Example 2

Two solutions of the dye CD-1 in 1-methoxy-2-propanol and each of the secondary solvents listed in Table 2 (90 to 10 and 97 to 3 by volume) were prepared. For each secondary (conformality controlling) solvent, the conformality and substrate damage obtained with the solutions coated on the substrate of example 1 are tabulated below in Table 2. The footnotes in Table 2 have the same meaning in Tables 3–5.

TABLE 2

| Secondary solvent | 90 to 10 mixture of 1-methoxy-2-propanol and secondary solvent | | | 97 to 3 mixture of 1-methoxy-2-propanol and secondary solvent | | |
|---|---|---|---|---|---|---|
| | $OD^1$ | groove $loss^2$ | $conf.^3$ | $OD^1$ | groove $loss^2$ | $conf.^3$ |
| none (1-methoxy-2-propanol only) | 0.97 | 0.0 | 80.9 | | | |
| 4-hydroxy-4-methyl-2-pentanone | | | | 1.11 | 0.1 | 44.8 |
| 1-methyl-2-pyrrolidinone | 1.22 | 21.0 | 41.9 | 1.16 | 0.5 | 29.9 |
| ethyl trichloroacetate | 0.97 | 10.1 | 64.4 | 1.81 | 0.5 | 71.0 |
| 2,3-dichlorobenzotrifluoride | | | | 1.08 | 0.0 | 79.1 |
| 1,3-Dichlorobenzene | 0.94 | 18.0 | 70.0 | 1.04 | 0.8 | 79.2 |
| mesityl oxide | 0.98 | 8.1 | 77.7 | 0.95 | 0.6 | 81.5 |
| 1,2,4-trimethylbenzene | 0.97 | 5.6 | 76.5 | 0.79 | 0.8 | 81.6 |
| cyclohexanone | 0.78 | 0.3 | 81.1 | 0.83 | 0.0 | 81.3 |
| 2-(2-methoxyethoxy)ethanol | 0.82 | 1.1 | 42.3 | 0.91 | 1.2 | 75.0 |
| 2-methylcyclohexanol | 0.95 | 0.0 | 81.4 | 0.93 | 0.0 | 80.6 |
| 3-methylcyclohexanol | 0.94 | 0.4 | 80.7 | 0.96 | 0.5 | 80.7 |
| 4-methylcyclohexanol | 0.95 | 0.2 | 80.7 | 0.99 | 0.5 | 80.2 |
| tert.pentyl alcohol | 1.06 | 0.0 | 78.1 | 1.03 | 0.0 | 78.8 |
| 2-pentanol | 1.05 | 0.0 | 77.7 | 1.00 | 0.0 | 79.3 |
| 3-pentanol | 1.02 | 0.0 | 77.5 | 1.02 | 0.0 | 78.5 |
| 2,4-pentanediol | 1.08 | 0.0 | 77.0 | 1.01 | 0.0 | 77.8 |
| 2,5-dimethoxytetrahydrofuran | 1.03 | 12.2 | 74.1 | 1.02 | 0.0 | 78.0 |
| 2-methylcyclohexanone | 0.90 | 10.2 | 51.7 | 0.91 | 0.3 | 80.6 |
| 3-methylcyclohexanone | 0.99 | 8.0 | 63.6 | 0.92 | 0.3 | 62.9 |
| 4-methylcyclohexanone | 0.99 | 2.5 | 65.2 | 0.88 | 0.0 | 51.0 |

[1]Optical density of the dye layer on grooved substrate as measured at 673 nm
[2]Percent change in groove depth as measured by transmission diffractometry
[3]Conformality (as measured by reflective diffractometry) expressed as %

Example 3

Solutions of a dye mixture containing the dyes CD-1 and

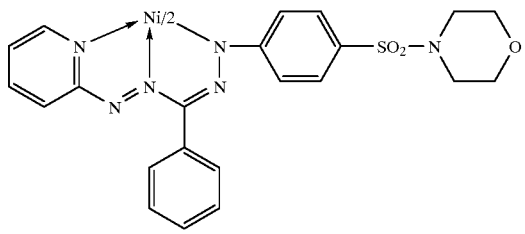

and

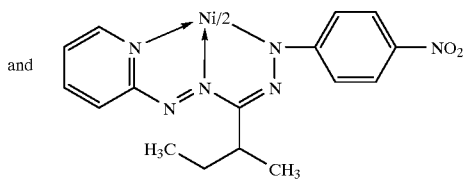

(7:2:1 respectively) in 1-methoxy-2-propanol and a secondary solvent were prepared, coated on grooved polycarbonate CD substrates 54 nm deep and the results evaluated as described in Example 2 above and tabulated in Table 3.

TABLE 3

| Secondary solvent | 95 to 5 mixture of 1-methoxy-2-propanol and secondary solvent | | 97 to 3 mixture of 1-methoxy-2-propanol and secondary solvent | |
|---|---|---|---|---|
| | $conf.^3$ | groove $loss^2$ | $conf.^3$ | groove $loss^2$ |
| none (1-methoxy-2-propanol only) | | | 91.0 | 0.0 |
| 4-hydroxy-methyl-2-pentanone | | | 42.4 | 0.0 |
| o-xylene | 87.9 | 3.3 | 89.9 | 3.5 |
| cyclohexanol | 92.0 | 1.6 | | |
| t-butoxy-2-ethoxy ether | 88.5 | 1.8 | | |
| 2,5-dimethoxy tetrahydrofuran | 89.9 | 3.7 | 89.6 | 3.5 |
| 4-heptanone | 90.9 | 2.9 | | |
| 2,6-dimethyl-4-heptanone | 88.8 | 2.4 | | |
| cyclohexanone | 76.6 | 3.3 | 81.2 | 3.3 |
| 2-methyl cyclohexanone | 85.7 | 3.7 | | |
| 3-methyl cyclohexanone | | | | |
| 4-methyl cyclohexanone | | | 48.8 | 2.4 |
| isobutyl isobutyrate | 88.7 | 2.0 | | |

TABLE 3-continued

| Secondary solvent | 95 to 5 mixture of 1-methoxy-2-propanol and secondary solvent | | 97 to 3 mixture of 1-methoxy-2-propanol and secondary solvent | |
|---|---|---|---|---|
| | conf.[3] | groove loss[2] | conf.[3] | groove loss[2] |
| amyl acetate | 87.6 | 2.7 | | |
| 3-methoxy-1-butanol | 84.6 | 1.5 | | |
| ethyl glycolate | 77.5 | 1.8 | | |
| ethyl lactate | 76.4 | 2.0 | | |
| propylene glycol methyl ether acetate | 89.6 | 2.7 | 87.6 | 2.4 |

Example 4

Solutions of the dye mixture of example 3 in 1-methoxy-2-propanol and a second solvent were prepared, coated on grooved polycarbonate CD substrates 200 nm deep and the results evaluated as described in Example 2 above and tabulated in Table 4.

TABLE 4

| Secondary solvent | 90 to 10 mixture of 1-methoxy-2-propanol and secondary solvent | | 95 to 5 mixture of 1-methoxy-2-propanol and secondary solvent | | 97 to 3 mixture of 1-methoxy-2-propanol and secondary solvent | |
|---|---|---|---|---|---|---|
| | conf.[3] | groove loss[2] | conf.[3] | groove loss[2] | conf.[3] | groove loss[2] |
| none (1-methoxy-2-propanol only) | 74.4 | 0.0 | | | | |
| 4-hydroxy-4-methyl-2-pentanone | 49.8 | | | | | |
| nonane | 73.7 | 1.5 | | | | |
| o-xylene | 66.7 | 13.1 | 74.5 | 1.4 | | |
| m-xylene | 64.7 | 19.9 | 74.2 | 1.1 | | |
| cyclohexanol | 75.5 | 0.0 | | | | |
| cyclopentanol | 74.6 | 0.5 | | | | |
| cis-2-methylcyclohexanol | 75.4 | 0.5 | | | | |
| cis-3-methyl-1-cyclohexanol | 75.5 | 0.0 | | | | |
| cis-4-methyl-1-cyclohexanol | 75.3 | 0.0 | | | | |
| butyl ether | 74.2 | 1.9 | | | | |
| t-butoxy-2-ethoxy ether | 66.0 | 1.7 | | | | |
| 2,5-dimethoxy tetrahydrofuran | 67.2 | 12.3 | 74.5 | 1.1 | | |
| anisole | 57.2 | 36.6 | 74.2 | 3.6 | | |
| 4-heptanone | 74.3 | 3.5 | | | | |
| 3-heptanone | 74.3 | 5.0 | | | | |
| 2,6-dimethyl-4-heptanone | | | 74.3 | 0.2 | | |
| cyclohexanone | 46.4 | 16.1 | 73.8 | 1.5 | | |
| 2-methyl cyclohexanone | 45.5 | 22.7 | 74.9 | 0.8 | | |
| 3-methyl cyclohexanone | 55.9 | >20% | 47.6 | 1.6 | 61.1 | 1.7 |
| 4-methyl cyclohexanone | 56.4 | >20% | 46.2 | 1.4 | 54.9 | 1.7 |
| 2,4-pentanedione | 43.4 | 36.5 | | | | |
| n-propyl isobutyrate | 74.3 | 2.9 | | | | |
| isopropyl isobutyrate | 73.8 | 2.0 | | | | |
| isobutyl isobutyrate | 74.3 | 3.7 | | | | |
| butyl propionate | 73.9 | 4.5 | | | | |
| isobutyl propionate | 74.3 | 2.2 | | | | |
| propyl butryate | 74.0 | 5.1 | | | | |
| amyl acetate | 74.4 | 2.8 | | | | |
| 1,2,3-trichloropropane | 56.7 | 9.6 | 66.0 | 2.4 | | |
| bromobenzene | 70.2 | 27.8 | 74.1 | 3.3 | | |
| 1-bromo-3-chloropropane | 68.6 | 17.1 | 74.4 | 2.1 | | |
| N,N dimethyl formamide | 59.6 | 41.0 | 74.4 | 3.2 | | |
| 3-methoxy-1-butanol | 72.9 | 0.7 | | | | |

TABLE 4-continued

| | 90 to 10 mixture of 1-methoxy-2-propanol and secondary solvent | | 95 to 5 mixture of 1-methoxy-2-propanol and secondary solvent | | 97 to 3 mixture of 1-methoxy-2-propanol and secondary solvent | |
|---|---|---|---|---|---|---|
| Secondary solvent | conf.³ | groove loss² | conf.³ | groove loss² | conf.³ | groove loss² |
| 2-methoxyethoxy ethanol | 38.5 | 6.7 | 66.7 | 1.4 | | |
| furfuryl alcohol | 39.5 | 2.7 | 36.8 | 1.7 | 31.4 | 1.5 |
| 1-hydroxy-2-propanone | 25.8 | 0.0 | 60.2 | 0.3 | | |
| 4-hydroxy-2-butanone | 52.7 | 1.2 | 63.4 | 1.6 | | |
| 4-hydroxy-4-methyl-2-pentanone | | | 49.8 | | | |
| 2,2,2-trichloroethanol | 52.7 | 4.7 | 47.5 | 0.8 | 42.1 | 0.9 |
| 3-chloro-1-propanol | 43.0 | 2.7 | 39.3 | 0.9 | 33.9 | 1.2 |
| ethyl glycolate | 70.8 | 0.9 | | | | |
| ethyl lactate | 71.1 | 1.1 | | | | |
| propylene glycol methyl ether acetate | 50.7 | 8.4 | 70.0 | 0.0 | | |
| t-butyl acetoacetate | 47.3 | 14.0 | 42.5 | 9.3 | 38.4 | 1.5 |

Example 5

Solutions of the dye mixture of example 3 in 1-methoxy-2-propanol and a second solvent were prepared, coated on grooved polycarbonate CD substrates 235 nm deep and the results evaluated as described in Example 2 and tabulated in Table 5.

TABLE 5

| | 97 to 3 mixture of 1-methoxy-2-propanol and secondary solvent | |
|---|---|---|
| Secondary solvent | conf.³ | groove loss² |
| none (1-methoxy-2-propanol only) | 54.7 | 1.3 |
| 4-hydroxy-4-methyl-2-pentanone | 47.7 | 1.7 |
| trichloroethanol | 46.3 | 1.5 |
| 3-chloro-1-propanol | 36.5 | 1.3 |
| 1,4-dichlorobutane | 55.5 | 3.5 |
| 3-bromopropionitrile | 37.3 | 5.4 |
| 2-(bromomethyl)-tetrahydro-2H-pyran | 43.3 | 3.5 |
| 2-chloromethyl-1,3-dioxolane | 56.5 | 3.8 |
| 1,2-dibromopropane | 55.4 | 2.4 |
| 2,4-pentanedione | 58.9 | 3.8 |
| 1-bromo-4-fluorobenzene | 55.8 | 2.4 |
| 2-chloro-6-fluorotoluene | 55.1 | 2.1 |
| ethyl trichloroacetate | 55.5 | 1.6 |
| 2-chlorobenzotrifluoride | 54.9 | 1.3 |
| furfuryl alcohol | 34.9 | 1.3 |
| 3-ethoxy propionitrile | 41.8 | 7.7 |
| dimethyl cyanamide | 54.8 | 6.6 |
| dimethyl acetamide | 58.4 | 3.3 |
| diethyl formamide | 39.4 | 3.8 |
| dimethyl propionamide | 39.6 | 9.3 |
| 2,5-dimethoxy-2,5-dihydrofuran | 57.5 | 3.3 |
| ethyl 3-chloro propionate | 52.1 | 3.0 |
| ethyl pyruvate | 58.0 | 3.1 |

Example 6

The ability to control conformality is not limited to cyanine dyes in alcoholic solvents. Similar results were obtained using a phthalocyanine dye in an octane based solution. Thus the phthalocyanine pictured below was dissolved in octane at 3% solids and coated on a 30 nm deep grooved substrate. Conformality was measured at 92%. When the experiment was repeated with a 3% solution in octane:cyclooctane (9:1), conformality dropped to 48%.

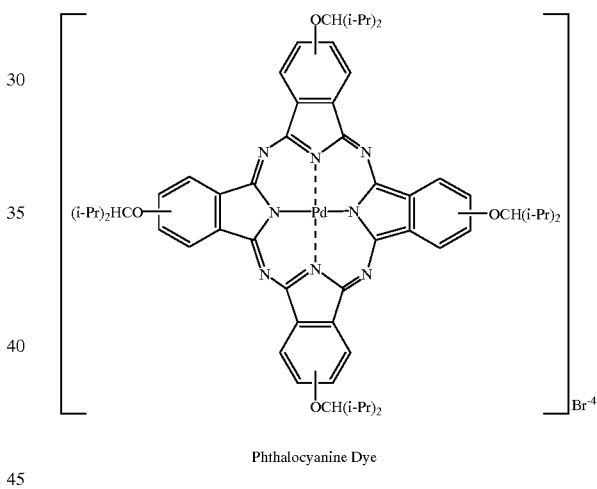

Phthalocyanine Dye $Br^{-4}$ means approximately 4 bromine atoms per molecule.

This invention has been described with particular reference to preferred embodiments thereof but it will be understood that modifications can be made within the spirit and scope of the invention.

We claim:

1. A method of coating an optical recording layer on a transparent grooved support to achieve a preselected conformality, comprising the steps of:

(I) forming a solution of a laser recording dye, including dye mixtures, in a solvent mixture (a) selected to provide said conformality and (b) comprising a primary and a secondary solvent;

(II) coating the solution on the grooved side of the support; wherein the solvent mixture contains:

(A) from 90 to 99 volume percent of the primary solvent selected from the group consisting of: 1-methoxy-2-propanol, octane, t-butyl acetate, t-butyl propionate, isopropyl isobutyrate, isobutyl isobutyrate, ethyl pivalate, t-butyl methyl ketone, diisobutyl ketone and diisobutyl ether; and (B) from 1 to 10 volume percent of the secondary solvent having a higher boiling point than the primary solvent and selected from the group consisting of 1-methyl-2-pyrrolidinone; ethyl trichloroacetate; 2,3-dichlorobenzotrifluoride; 1,3-dichlorobenzene; mesityl oxide; 1,2,4-trimethylbenzene; 2-(2-methoxyethoxy)ethanol; 2-methylcyclohexanol; 3-methylcyclohexanol; 4-methylcyclohexanol; tertiary pentyl alcohol; 2-pentanol; 3-pentanol; 2,4-pentanediol; 1,2,3-trichloropropane; 1,2-dibromopropane; 1,4-dichlorobutane; 1-bromo-3-chloropropane; 1-bromo-4-fluorobenzene; 1-hydroxy-2-propanone; 2,2,2-trichloroethanol; 2,4-pentanedione; 2,5-dimethoxy tetrahydrofuran; 2,5-dimethoxy-2,5-dihydrofuran; 2,6-dimethyl-4-heptanone; 2-(bromomethyl)tetrahydro-2H-pyran; 2-chloro-6-fluorotoluene; 2-chlorobenzotrifluoride; 2-chloromethyl-1,3-dioxolane; 2-methoxyethoxy ethanol; 2-methyl cyclohexanone; 3-bromopropionitrile; 3-chloro-1-propanol; 3-ethoxy propionitrile; 3-heptanone; 3-methoxy-1-butanol; 3-methyl cyclohexanone; 4-heptanone; 4-hydroxy-2-butanone; 4-methyl cyclohexanone; amyl acetate; anisole; bromobenzene; butyl ether; butyl propionate; cis-2-methylcyclohexanol; cis-3-methyl-1-cyclohexanol; cyclohexanol; cyclohexanone; cyclopentanol; 4-hydroxy-4-methyl-2-pentanone; diethyl formamide; dimethyl acetamide; dimethyl cyanamide; dimethyl propionamide; ethyl 3-chloro propionate; ethyl glycolate; ethyl lactate; ethyl pyruvate; ethyl trichloroacetate; furfuryl alcohol; isobutyl isobutyrate; isobutyl propionate; isopropyl isobutyrate; m-xylene; N,N-dimethyl formamide; n-propyl isobutyrate; nonane; o-xylene; propyl butryate; propylene glycol methyl ether acetate; t-butoxy-2-ethoxy ether and t-butyl acetoacetate.

2. A laser dye recording solution containing a laser recording dye, including dye mixtures, in a solvent mixture selected to provide a preselected conformality comprising:

(A) from 90 to 99 volume percent of a primary solvent selected from the group consisting of 1-methoxy-2-propanol, octane, t-butyl acetate, t-butyl propionate, isopropyl isobutyrate, isobutyl isobutyrate, ethyl pivalate, t-butyl methyl ketone, diisobutyl ketone and diisobutyl ether; and (B) from 1 to 10 volume percent of a secondary solvent that has a higher boiling point than the primary solvent and is selected from the group consisting of 1-methyl-2-pyrrolidinone; ethyl trichloroacetate; 2,3-dichlorobenzotrifluoride; 1,3-dichlorobenzene; mesityl oxide; 1,2,4-trimethylbenzene; 2-(2-methoxyethoxy)ethanol; 2-methylcyclohexanol; 3-methylcyclohexanol; 4-methylcyclohexanol; tertiary pentyl alcohol; 2-pentanol; 3-pentanol; 2,4-pentanediol; 1,2,3-trichloropropane; 1,2-dibromopropane; 1,4-dichlorobutane; 1-bromo-3-chloropropane; 1-bromo-4-fluorobenzene; 1-hydroxy-2-propanone; 2,2,2-trichloroethanol; 2,4-pentanedione; 2,5-dimethoxy tetrahydrofuran; 2,5-dimethoxy-2,5-dihydrofuran; 2,6-dimethyl-4-heptanone; 2-(bromomethyl)-tetrahydro-2H-pyran; 2-chloro-6-fluorotoluene; 2-chlorobenzotrifluoride; 2-chloromethyl-1,3-dioxolane; 2-methoxyethoxy ethanol; 2-methyl cyclohexanone; 3-bromopropionitrile; 3-chloro-1-propanol; 3-ethoxy propionitrile; 3-heptanone; 3-methoxy-1-butanol; 3-methyl cyclohexanone; 4-heptanone; 4-hydroxy-2-butanone; 4-methyl cyclohexanone; amyl acetate; anisole; bromobenzene; butyl ether; butyl propionate; cis-2-methylcyclohexanol; cis-3-methyl-1-cyclohexanol; cyclohexanol; cyclohexanone; cyclopentanol; 4-hydroxy-4-methyl-2-pentanone; diethyl formamide; dimethyl acetamide; dimethyl cyanamide; dimethyl propionamide; ethyl 3-chloro propionate; ethyl glycolate; ethyl lactate; ethyl pyruvate; ethyl trichloroacetate; furfuryl alcohol; isobutyl isobutyrate; isobutyl propionate; isopropyl isobutyrate; m-xylene; N,N-dimethyl formamide; n-propyl isobutyrate; nonane; o-xylene; propyl butryate; propylene glycol methyl ether acetate; t-butoxy-2-ethoxy ether and t-butyl acetoacetate.

3. A method of coating an optical recording layer on a transparent grooved support to achieve a preselected conformality, comprising the steps of:

(I) forming a solution of a laser recording dye, including dye mixtures, in a solvent mixture of a primary and a secondary solvent;

(II) coating the solution on the grooved side of the support; wherein the solvent mixture is selected from the mixtures of Table 6 thereby providing the corresponding recording layer conformality designated for that mixture in Table 6:

TABLE 6

| Secondary solvent | 90 to 10 mixture of 1-methoxy-2-propanol and secondary solvent conformality | 97 to 3 mixture of 1-methoxy-2-propanol and secondary solvent conformality |
|---|---|---|
| 4-hydroxy-4-methyl-2-pentanone | | 44.8 |
| 1-methyl-2-pyrrolidinone | 41.9 | 29.9 |
| ethyl trichloroacetate | 64.4 | 71.0 |
| 2,3-dichlorobenzotrifluoride | | 79.1 |
| 1,3-Dichlorobenzene | 70.0 | 79.2 |
| mesityl oxide | 77.7 | 81.5 |
| 1,2,4-trimethylbenzene | 76.5 | 81.6 |
| cyclohexanone | 81.1 | 81.3 |
| 2-(2-methoxyethoxy)-ethanol | 42.3 | 75.0 |
| 2-methylcyclohexanol | 81.4 | 80.6 |
| 3-methylcyclohexanol | 80.7 | 80.7 |
| 4-methylcyclohexanol | 80.7 | 80.2 |
| tert. pentyl alcohol | 78.1 | 78.8 |
| 2-pentanol | 77.7 | 79.3 |
| 3-pentanol | 77.5 | 78.5 |
| 2,4-pentanediol | 77.0 | 77.8 |
| 2,5-dimethoxytetrahydrofuran | 74.1 | 78.0 |
| 2-methylcyclohexanone | 51.7 | 80.6 |
| 3-methylcyclohexanone | 63.6 | 62.9 |
| 4-methylcyclohexanone | 65.2 | 51.0 |

4. A method of coating an optical recording layer on a transparent grooved support to achieve a preselected conformality, comprising the steps of (I) forming a solution of a laser recording dye, including dye mixtures, in a solvent mixture of a primary and secondary solvent and (II) coating the solution on the grooved side of the support; wherein the mixtures and corresponding conformalities are selected from Table 7:

TABLE 7

| Secondary solvent | 95 to 5 mixture of 1-methoxy-2-propanol and secondary solvent conformality | 97 to 3 mixture of 1-methoxy-2-propanol and secondary solvent conformality |
|---|---|---|
| 4-hydroxy-4-methyl-2-pentanone | | 42.4 |
| o-xylene | 87.9 | 89.9 |
| Cyclohexanol | 92.0 | |
| t-butoxy-2-ethoxy ether | 88.5 | |
| 2,5-dimethoxy tetrahydrofuran | 89.9 | 89.6 |
| 4-heptanone | 90.9 | |
| 2,6-dimethyl-4-heptanone | 88.8 | |
| cyclohexanone | 76.6 | 81.2 |
| 2-methyl cyclohexanone | 85.7 | |
| 3-methyl cyclohexanone | | |
| 4-methyl cyclohexanone | | 48.8 |
| isobutyl isobutyrate | 88.7 | |
| amyl acetate | 87.6 | |

TABLE 7-continued

| Secondary solvent | 95 to 5 mixture of 1-methoxy-2-propanol and secondary solvent conformality | 97 to 3 mixture of 1-methoxy-2-propanol and secondary solvent conformality |
|---|---|---|
| 3-methoxy-1-butanol | 84.6 | |
| ethyl glycolate | 77.5 | |
| ethyl lactate | 76.4 | |
| propylene glycol methyl ether acetate | 89.6 | 87.6 |

5. A method of coating an optical recording layer on a transparent grooved support to achieve a preselected conformality, comprising the steps of (I) forming a solution of a laser recording dye, including dye mixtures, in a solvent mixture of a primary and secondary solvent and (II) coating the solution on the grooved side of the support; wherein the solvent mixtures and corresponding conformalties are selected from Table 8:

TABLE 8

| Secondary solvent | 90 to 10 mixture of 1-methoxy-2-propanol and secondary solvent conformality | 95 to 5 mixture of 1-methoxy-2-propanol and secondary solvent conformality | 97 to 3 mixture of 1-methoxy-2-propanol and secondary solvent conformality |
|---|---|---|---|
| 4-hydroxy-4-methyl-2-pentanone | 49.8 | | |
| Nonane | 73.7 | | |
| o-xylene | 66.7 | 74.5 | |
| m-xylene | 64.7 | 74.2 | |
| Cyclohexanol | 75.5 | | |
| Cyclopentanol | 74.6 | | |
| cis-2-methylcyclohexanol | 75.4 | | |
| cis-3-methyl-1-cyclohexanol | 75.5 | | |
| cis-4-methyl-1-cyclohexanol | 75.3 | | |
| butyl ether | 74.2 | | |
| t-butoxy-2-ethoxy ether | 66.0 | | |
| 2,5-dimethoxy tetrahydrofuran | 67.2 | 74.5 | |
| Anisole | 57.2 | 74.2 | |
| 4-heptanone | 74.3 | | |
| 3-heptanone | 74.3 | | |
| 2,6-dimethyl-4-heptanone | | 74.3 | |
| Cyclohexanone | 46.4 | 73.8 | |
| 2-methyl cyclohexanone | 45.5 | 74.9 | |
| 3-methyl cyclohexanone | 55.9 | 47.6 | 61.1 |
| 4-methyl cyclohexanone | 56.4 | 46.2 | 54.9 |
| 2,4-pentanedione | 43.4 | | |
| n-propyl isobutyrate | 74.3 | | |
| Isopropyl isobutyrate | 73.8 | | |
| Isobutyl isobutyrate | 74.3 | | |
| butyl propionate | 73.9 | | |
| Isobutyl propionate | 74.3 | | |
| Propyl butryate | 74.0 | | |
| amyl acetate | 74.4 | | |
| 1,2,3-trichloropropane | 56.7 | 66.0 | |
| Bromobenzene | 70.2 | 74.1 | |
| 1-bromo-3-chloropropane | 68.6 | 74.4 | |

TABLE 8-continued

| Secondary solvent | 90 to 10 mixture of 1-methoxy-2-propanol and secondary solvent conformality | 95 to 5 mixture of 1-methoxy-2-propanol and secondary solvent conformality | 97 to 3 mixture of 1-methoxy-2-propanol and secondary solvent conformality |
|---|---|---|---|
| N,N dimethyl formamide | 59.6 | 74.4 | |
| 3-methoxy-1-butanol | 72.9 | | |
| 2-methoxyethoxy ethanol | 38.5 | 66.7 | |
| Furfuryl alcohol | 39.5 | 36.8 | 31.4 |
| 1-hydroxy-2-propanone | 25.8 | 60.2 | |
| 4-hydroxy-2-butanone | 52.7 | 63.4 | |
| 4-hydroxy-4-methyl-2-pentanone | | 49.8 | |
| 2,2,2-trichloroethanol | 52.7 | 47.5 | 42.1 |
| 3-chloro-1-propanol | 43.0 | 39.3 | 33.9 |
| ethyl glycolate | 70.8 | | |
| ethyl lactate | 71.1 | | |
| Propylene glycol methyl ether acetate | 50.7 | 70.0 | |
| t-butyl acetoacetate | 47.3 | 42.5 | 38.4 |

6. A method of coating an optical recording layer on a transparent grooved support to achieve a preselected conformality, comprising the steps of (I) forming a solution of a laser recording dye, including dye mixtures, in a solvent mixture of a primary and secondary solvent and (II) coating the solution on the grooved side of the support; wherein the solvent mixture and corresponding conformalities are selected from Table 9:

TABLE 9

| Secondary solvent | 97 to 3 mixture of 1-methoxy-2-propanol and secondary solvent conformality |
|---|---|
| 4-hydroxy-4-methyl-2-pentanone | 47.7 |
| Trichloroethanol | 46.3 |
| 3-chloro-1-propanol | 36.5 |
| 1,4-dichlorobutane | 55.5 |
| 3-bromopropionitrile | 37.3 |
| 2-(bromomethyl)-tetrahydro-2H-pyran | 43.3 |
| 2-chloromethyl-1,3-dioxolane | 56.5 |
| 1,2-dibromopropane | 55.4 |
| 2,4-pentanedione | 58.9 |
| 1-bromo-4-fluorobenzene | 55.8 |
| 2-chloro-6-fluorotoluene | 55.1 |
| ethyl trichloroacetate | 55.5 |
| 2-chlorobenzotrifluoride | 54.9 |
| furfuryl alcohol | 34.9 |
| 3-ethoxy propionitrile | 41.8 |
| dimethyl cyanamide | 54.8 |
| dimethyl acetamide | 58.4 |
| diethyl formamide | 39.4 |
| dimethyl propionamide | 39.6 |
| 2,5-dimethoxy-2,5-dihydrofuran | 57.5 |
| ethyl 3-chloro propionate | 52.1 |
| ethyl pyruvate | 58.0 |

7. The method of claim 1 wherein the primary solvent is isobutyl isobutyrate.

8. The method of claim 1 wherein the primary solvent is diisobutyl ketone.

9. The method of claim 1 wherein the primary solvent is 1-methoxy-2-propanol.

10. The method of claim 1 wherein the primary solvent is octane.

11. The method of claim 1 wherein the solvent mixture comprises from 90 to 99 volume percent of the primary solvent 1-methoxy-2-propanol and 1 to 10 volume percent of the secondary solvent selected from the group consisting of 1-methyl-2-pyrrolidinone; ethyl trichloroacetate; 2,3-dichlorobenzotrifluoride; 1,3-dichlorobenzene; mesityl oxide; 1,2,4-trimethylbenzene; 2-(2-methoxyethoxy) ethanol; 2-methylcyclohexanol; 3-methylcyclohexanol; 4-methylcyclohexanol; tertiary pentyl alcohol; 2-pentanol; 3-pentanol; 2,4-pentanediol; 1,2,3-trichloropropane; 1,2-dibromopropane; 1,4-dichlorobutane; 1-bromo-3-chloropropane; 1-bromo-4-fluorobenzene; 1-hydroxy-2-propanone; 2,2,2-trichloroethanol; 2,4-pentanedione; 2,5-dimethoxy tetrahydrofuran; 2,5-dimethoxy-2,5-dihydrofuran; 2,6-dimethyl-4-heptanone; 2-(bromomethyl)-tetrahydro-2H-pyran; 2-chloro-6-fluorotoluene; 2-chlorobenzotrifluoride; 2-chloromethyl-1,3-dioxolane; 2-methoxyethoxy ethanol; 2-methyl cyclohexanone; 3-bromopropionitrile; 3-chloro-1-propanol; 3-ethoxy propionitrile; 3-heptanone; 3-methoxy-1-butanol; 3-methyl cyclohexanone; 4-heptanone; 4-hydroxy-2-butanone; 4-methyl cyclohexanone; amyl acetate; anisole; bromobenzene; butyl ether; butyl propionate; cis-2-methylcyclohexanol; cis-3-methyl-1-cyclohexanol; cyclohexanol; cyclohexanone; cyclopentanol; 4-hydroxy-4-methyl-2-pentanone; diethyl formamide; dimethyl acetamide; dimethyl cyanamide; dimethyl propionamide; ethyl 3-chloro propionate; ethyl glycolate; ethyl lactate; ethyl pyruvate; ethyl trichloroacetate; furfuryl alcohol; isobutyl isobutyrate; isobutyl propionate; isopropyl isobutyrate; m-xylene; N,N-dimethyl formamide; n-propyl isobutyrate; nonane; o-xylene; propyl butryate; propylene glycol methyl ether acetate; t-butoxy-2-ethoxy ether and t-butyl acetoacetate.

12. The method of claim 11 wherein the solvent mixture is selected from the group consisting of (a) 90 volume percent 1-methoxy-2-propanol and 10 weight percent of the secondary solvent; (b) 95 volume percent 1-methoxy-2-propanol and 5 volume percent of the secondary solvent and (c) 97 volume percent 1-methoxy-2-propanol and 3 volume percent of the secondary solvent.

13. The method of claim 1 wherein the laser recording dye is selected from the group consisting of formazan, indoaniline, cyanine, azo, metallized azo, phthalocyanine, metallized formazan dyes and mixtures of said such dyes.

14. The solution of claim 2 wherein the primary solvent is isobutyl isobutyrate.

15. The solution of claim 2 wherein the primary solvent is diisobutyl ketone.

16. The solution of claim 2 wherein the primary solvent is 1-methoxy-2-propanol.

17. The solution of claim 2 wherein the primary solvent is octane.

18. The solution of claim 2 wherein the solvent mixture comprises from 90 to 99 volume percent the primary solvent 1-methoxy-2-propanol and 1 to 10 volume percent of the secondary solvent selected from the group consisting of 1-methyl-2-pyrrolidinone; ethyl trichloroacetate; 2,3-dichlorobenzotrifluoride; 1,3-dichlorobenzene; mesityl oxide; 1,2,4-trimethylbenzene; 2-(2-methoxyethoxy) ethanol; 2-methylcyclohexanol; 3-methylcyclohexanol; 4-methylcyclohexanol; tertiary pentyl alcohol; 2-pentanol; 3-pentanol; 2,4-pentanediol; 1,2,3-trichloropropane; 1,2-dibromopropane; 1,4-dichlorobutane; 1-bromo-3-chloropropane; 1-bromo-4-fluorobenzene; 1-hydroxy-2-propanone; 2,2,2-trichloroethanol; 2,4-pentanedione; 2,5-dimethoxy tetrahydrofuran; 2,5-dimethoxy-2,5-dihydrofuran; 2,6-dimethyl-4-heptanone; 2-(bromomethyl)-tetrahydro-2H-pyran; 2-chloro-6-fluorotoluene; 2-chlorobenzotrifluoride; 2-chloromethyl-1,3-dioxolane; 2-methoxyethoxy ethanol; 2-methyl cyclohexanone; 3-bromopropionitrile; 3-chloro-1-propanol; 3-ethoxy propionitrile; 3-heptanone; 3-methoxy-1-butanol; 3-methyl cyclohexanone; 4-heptanone; 4-hydroxy-2-butanone; 4-methyl cyclohexanone; amyl acetate; anisole; bromobenzene; butyl ether; butyl propionate; cis-2-methylcyclohexanol; cis-3-methyl-1-cyclohexanol; cyclohexanol; cyclohexanone; cyclopentanol; 4-hydroxy-4-methyl-2-pentanone; diethyl formamide; dimethyl acetamide; dimethyl cyanamide; dimethyl propionamide; ethyl 3-chloro propionate; ethyl glycolate; ethyl lactate; ethyl pyruvate; ethyl trichloroacetate; furfuryl alcohol; isobutyl isobutyrate; isobutyl propionate; isopropyl isobutyrate; m-xylene; N,N-dimethyl formamide; n-propyl isobutyrate; nonane; o-xylene; propyl butryate; propylene glycol methyl ether acetate; t-butoxy-2-ethoxy ether and t-butyl acetoacetate.

19. The solution mixture of claim 18 wherein the solvent mixture is selected from the group consisting of (a) 90 volume percent 1-methoxy-2-propanol and 10 weight percent of the secondary solvent; (b) 95 volume percent 1-methoxy-2-propanol and 5 volume percent of the secondary solvent and (c) 97 volume percent 1-methoxy-2-propanol and 3 volume percent of the secondary solvent.

20. The solution of claim 2 wherein the laser recording dye is selected from the group consisting of formazan, indoaniline, cyanine, azo, metallized azo, phthalocyanine, metallized formazan dyes and mixtures of said dyes.

21. An optical recording element comprising, in the following order, a transparent grooved substrate, an optical recording layer and a reflective layer wherein the optical recording layer is formed from a laser dye recording solution according to claim 2.

* * * * *